Dec. 23, 1969  R. E. SKAMFER ETAL  3,486,038
ELECTRICAL CONTROL CIRCUITS
Filed April 4, 1968  4 Sheets-Sheet 1

WITNESSES:
Bernard R. Gieguire
James F. Young

INVENTORS
Robert E. Skamfer and
Donal E. Baker.
BY
Donald R. Lackey
ATTORNEY

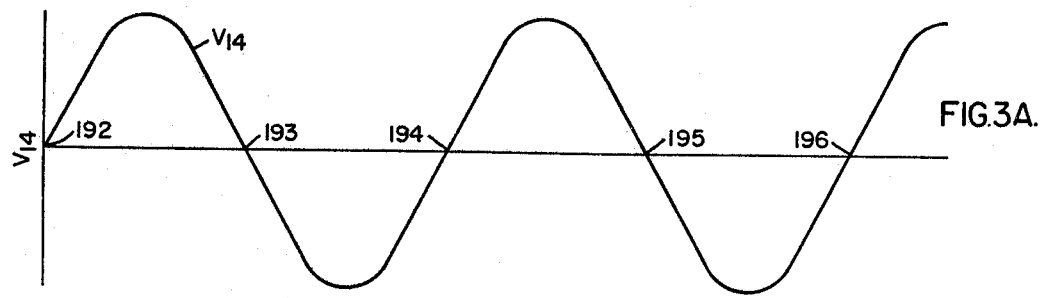
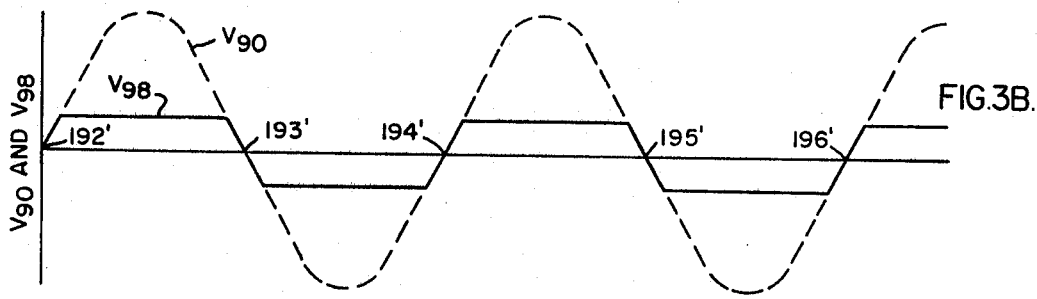
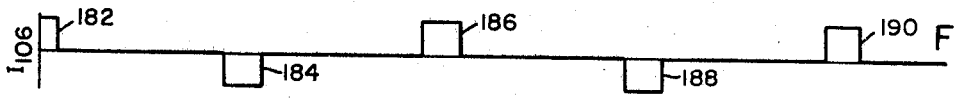
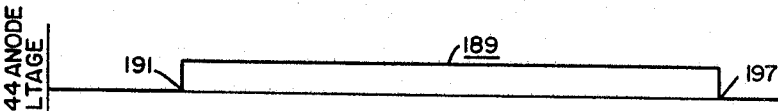
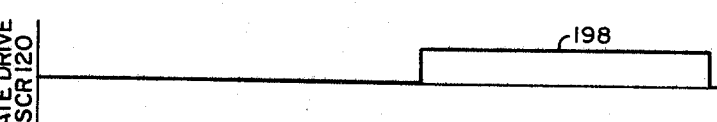
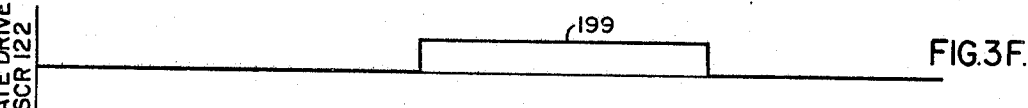
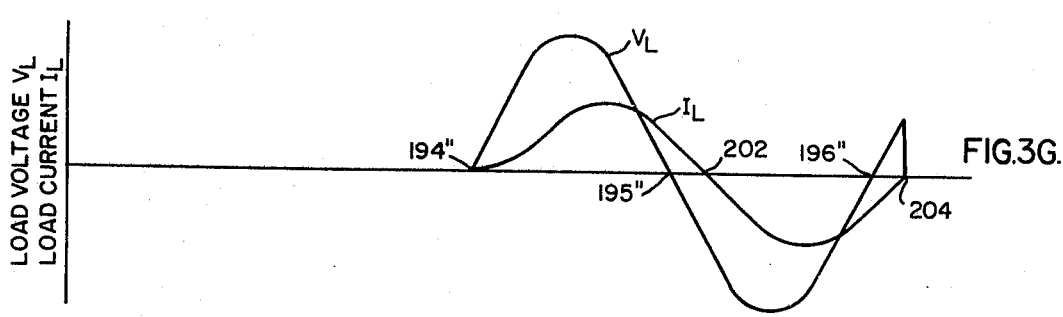

Dec. 23, 1969    R. E. SKAMFER ETAL    3,486,038
ELECTRICAL CONTROL CIRCUITS

Filed April 4, 1968    4 Sheets-Sheet 4

United States Patent Office 3,486,038
Patented Dec. 23, 1969

3,486,038
ELECTRICAL CONTROL CIRCUITS
Robert E. Skamfer, Elida, and Donal E. Baker, Lima, Ohio, assignors to Westinghouse Electric Corporation, Pittsburgh, Pa., a corporation of Pennsylvania
Filed Apr. 4, 1968, Ser. No. 718,851
Int. Cl. H01h 9/56
U.S. Cl. 307—133   9 Claims

ABSTRACT OF THE DISCLOSURE

Electrical control circuits which include static bilateral AC switching means adapted for connection between a source of AC potential and a load circuit, and firing means for providing switching signals for the static switching means. The firing means, which has first and second input terminal means, initiates switching signals upon the co-existence of signals at its first and second input terminal means. Voltage responsive means, adapted to be responsive to the source of AC potential, provides discrete current pulses at substantially the voltage zero points of the source of AC potential, which are applied to the first input terminal means. Control means is connected to the second input terminal means, which applies a signal thereto when it is desired to connect the source of AC potential to the load circuit.

BACKGROUND OF THE INVENTION

Field of the invention

The invention relates in general to electrical control circuits for switching static bilateral AC switching means connected between a source of AC potential and a load circuit, and more particularly to electrical control circuits for switching the static bilateral AC switching means to its conducitve state when the source of AC potential is substantially at a voltage zero point in its voltage waveform.

Description of the prior art

Electromagnetic contactors, because of their moving mechanical contacts, have inherent limitations in applications which require a fast response, repeated cycling, minimum contact bounce, long life and high reliability. Therefore when an application has specifications of this nature, static switching means, such as thyristors, are usually used. However, in certain applications, even static switching means may have disadvantages. For example, each time the static switching means is rendered conductive, the load current may go from zero to the load limited value in less than a few microseconds. This generates a frequency spectrum of energy which may feed back radio frequency energy into the power circuit. In those applications which have sensitive electronic equipment connected to the electrical system, this radio frequency energy must be prevented from entering the electrical system by adding large, bulky radio frequency filters. For example, aircraft electrical systems have many electronic components connected thereto which would be adversely affected by radio frequency energy in the electrical system. Therefore, it is essential that statically switched power supplies, such as those of the phase control type, include radio frequency filters to prevent energy created by high $di/dt$ from being fed back into the electrical system.

SUMMARY OF THE INVENTION

Briefly, the present invention relates to electrical control circuitry of the type having static bilateral AC switching means, such as thyristors, adapted for connection between a source of AC potential and a load circuit. The firing means for providing switching pulses for the static switching means, instead of being directly responsive to a control signal from control means which determines when the load circuit should be connected to the source of AC potential, is additionally responsive to voltage zero points in the waveform of the source of AC potential. Thus, in addition to a control signal from the conventional control means, the firing circuit requires a voltage zero responsive control signal responsive to the voltage zero points of the source of the AC potential, initiating switching pulses for the static switching means only when the two control signals co-exist. The load circuit is thus connected to the source of AC potential when the source potential is substantially zero, which reduces rapid changes in the load current and substantially reduces the amount of radio frequency energy created.

In one embodiment of the invention, the switching signals provided by the firing means are discrete pulses, synchronized with the voltage zero points of the source potential, which embodiment is suitable for use in those applications where the load circuit has a unity power factor.

In another embodiment of the invention, the switching signals, once initiated at a voltage zero point of the source potential, are continuous as long as the conventional control signal is applied to the firing means. Thus, this embodiment of the invention may be used in those applications where the power factor of the load circuit may be other than unity.

When the conventional control signal is removed from the firing means, the firing means ceases to provide switching pulses, and the static switching means switches to its nonconductive state at the first subsequent current zero point. Thus, the control circuits constructed according to the teachings of the invention connect the load circuit to a source of AC potential at a voltage zero point of the source potential, at which point the current is also zero since there is no current flowing in the load circuit, and the load circuit is disconnected from the source potential at a current zero point.

The control means for providing the conventional control signal may be simply switching means connected between a source of DC potential and the firing means, with the switching means being operated manually by an operator, or, automatic proportional on-off control responsive to regulating means of some suitable type may be used. In any event, harmonic distortion filters are eliminated, and radio frequency filters are either eliminated, or substantially reduced in size, due to the zero voltage switching characteristics of the control circuits, which prevents rapid changes in the load current, and therefore reduces the amount of radio frequency energy in the circuit.

BRIEF DESCRIPTION OF THE DRAWINGS

Further advantages and uses of the invention will become more apparent when considered in view of the following detailed description and drawings, in which:

FIGS. 3A through 3G are graphs illustrating certain voltage and current waveforms explanatory of the operation of the embodiment of the invention shown in FIG. 2;

DESCRIPTION OF PREFERRED EMBODIMENTS

Figure 1:
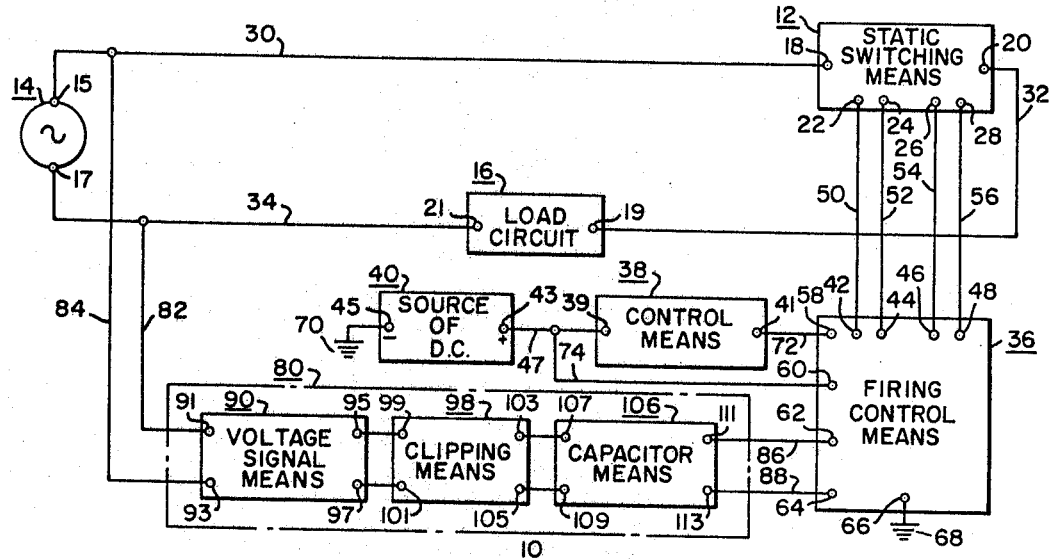
FIGURE 1 is a block diagram of an electrical control circuit constructed according to the teachings of the invention.

Referring now to the drawings, and FIG. 1 in particular, there is shown a block diagram of an electrical control circuit 10, constructed according to the teachings of the invention. Control circuit 10 includes static bilateral AC switching means 12, adapted for connection between a source 14 of alternating potential, having output terminals 15 and 17, and a load circuit 16 having terminals 19 and 21. For example, as shown in FIG. 1, static switching means 12, which may be of the semiconductor thyristor type, has main electrodes which are connected to terminals 18 and 20, and gate or control electrode means which are connected to terminals 22, 24, 26 and 28. The number of control electrodes may vary, depending upon whether the static switching means includes two triode thyristors of the reverse blocking type, i.e., silicon controlled rectifiers, connected in inverse parallel; or, a single bilateral triode thyristor, i.e., a triac. For purposes of example, it will be assumed that the static switching means 12 includes two silicon controlled rectifiers connected in inverse parallel, which requires four input terminals for its gating circuits.

The main electrodes of the static switching means 12 are serially connected with the source 14 and a load circuit 16, with terminal 18 of static switching means 12 being connected to terminal 15 of source 14 via conductor 30, terminal 20 of static switching means 12 connected to terminal 19 of load circuit 16 via conductor 32, and terminal 17 of source 14 connected to terminal 21 of load circuit 16 via conductor 34.

Control circuit 10 further includes suitable firing control means 36, for providing switching signals for the static switching means 12, conventional control means 38 having terminals 39 and 41, and a source 40 of DC potential having terminals 43 and 45. Firing control means 36 includes output terminals 42, 44, 46 and 48 connected to terminals 22, 24, 26 and 28 of static switching means 12 via conductors 50, 52, 54 and 56, respectively, and input terminals 58, 60, 62, 64 and 66, with terminal 66 being grounded at 68. Terminal 43 of source 40 of DC potential, which is the positive terminal, is connected to terminal 39 of control means 38 via conductor 47, and terminal 45 of source 40 is grounded at 70.

Input terminal 58 of firing control means 36 is connected to terminal 41 of control means 38 via conductor 72, and input terminal 60 of firing control means 36 is connected to the positive terminal 43 of the source 40 of DC potential, via conductor 74.

In general, control means 38 includes a suitable switching device (not shown) connected between its terminals 39 and 41, such as a mechanical type contactor, or a semiconductor switch such as a thyristor or transistor. If the application is such that static switching means 12 is used as a manually operated circuit breaker, the switching device in control means 38 may be manually controlled by an operator. If the application requires some type of regulation, such as regulation of the effective load voltage or load current, the switching device of control means 38 may be responsive to a suitable regulator (not shown).

If the firing means 36 were to initiate switching signals upon receiving a signal at input terminal 58 from control means 38, the voltage from source 14 at the time it is connected to load circuit 16 may be anywhere in its voltage waveform. The chances of closing the circuit at a voltage zero would be remote, thus creating radio frequency energy due to the rapid change in load current created by switching at other than the zero point in the voltage waveform. If the firing means were of the phase controlled type, achieving regulation of a predetermined quantity by controlling the firing phase angle in each half cycle, the voltage would be switched at other than its zero point, thus requiring bulky radio frequency and harmonic distortion filters in those applications having sensitive electronic equipment connected to the electrical system.

This invention discloses controlling the switching of the static switching means 12 at a voltage zero point of the source 14, eliminating the need for harmonic distortion filters, and eliminating or reducing the size of radio frequency filters, while still allowing programmed porportional on-off control to achieve a predetermined regulated electrical quantity, if required.

More specifically, the control circuit 10 shown in FIG. 1 includes voltage responsive means 80, which is adapted to be responsive to the source 14 of AC potential via conductors 82 and 84, which are connected to conductors 34 and 30, respectively, applying discrete current signal pulses to input terminals 62 and 64 of firing control means 36 via conductors 86 and 88, which pulses are synchronized with the voltage zero points in the waveform of the voltage of source potential 14.

Voltage responsive means 80, according to an embodiment of the invention, may include voltage signal means 90 having input terminals 91 and 93 and output terminals 95 and 97, clipping means 98 having input terminals 99 and 101 and output terminals 103 and 105, and capacitor means 106 having input terminals 107 and 109, and output terminals 111 and 113.

Voltage signal means 90, which has its input terminals 91 and 93 connected to conductors 82 and 84, respectively, provides an alternating voltage signal at its output terminals 95 and 97 which has its voltage zero points synchronized with the voltage zero points of source 14. The voltage signal at terminals 95 and 97 is connected to the input terminals 99 and 101 of clipping means 98. Clipping means 98 clips the peaks of both the positive and negative half cycles of the voltage signal at predetermined magnitudes, providing a voltage having substantially a square waveform at its output terminals 103 and 105.

The clipped voltage signal from clipping means 98 is applied to input terminals 107 and 109 of capacitor means 106, and capacitor means 106 allows discrete current pulses to flow during the short time the clipped voltage is changing magnitudes. Since the clipped voltage changes magnitudes for a short time immediately preceding, during and immediately following each voltage zero point, the current pulses are synchronized with the voltage zero points of the clipped voltage, and thus the voltage zero points of the voltage of source 14. The discrete synchronized current pulses are applied to input terminals 62 and 64 of firing control means 36 from output terminals 111 and 113 of capacitor means 106, via conductors 86 and 88, respectively.

Firing control means 36 instead of being arranged to provide switching signals upon receiving a signal from control means 38, is constructed to initiate switching signals upon the coexistence of signals from control means 38 and voltage responsive means 80. Firing control means 36 thus switches static switching means 12 to its conductive state at a voltage zero point of the source 14.

Figure 2:
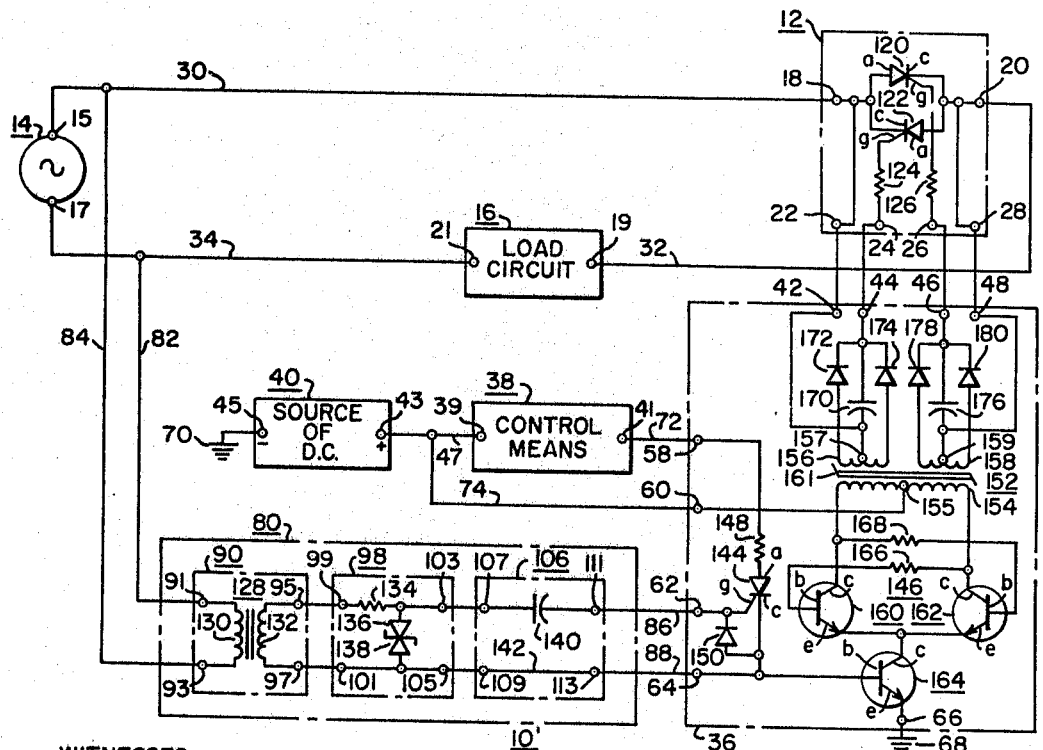
FIG. 2 is a schematic diagram of a control circuit illustrating an embodiment of the invention.

FIG. 2 is a schematic diagram which illustrates a control circuit 10' constructed according to an embodiment of the invention which may be used when the power factor of the load circuit 16 may be other than unity. Like reference numerals in FIGS. 1 and 2 indicate like functions and terminals.

More specifically, as shown in FIG. 2, static bilateral AC switching means 12 may include silicon controlled rectifiers 120 and 122, each having anode, cathode and gate electrodes a, c and g, respectively. Controlled rectifiers 120 and 122 are connected in an inverse parallel arrangement, and the parallel circuit is connected to terminals 18 and 20. The anode and cathode electrodes of controlled rectifiers 120 and 122 are connected to terminal 18, and the cathode and anode electrodes of controlled rectifiers 120 and 122 are connected to terminal 20. Input terminals 22 and 24 of static switching means 12 are connected to the cathode and gate electrodes, respectively, of controlled rectifier 122, with the connection between the gate electrode and terminal 24 including current limiting resistor 124. Input terminals 26 and 28 of static switching means 12 are connected to the gate and cathode electrodes, respectively, of controlled rectifier 120, with the connection between the gate electrode and terminal 26 including current limiting resistor 126.

The voltage signal means 90 for obtaining a voltage signal having its voltage zero points synchronized with the voltage zero point of the voltage from source 14, may be a potential transformer 128 having a primary winding 130 connected to terminals 91 and 93, and a secondary winding 132 connected to terminals 95 and 97.

The clipping means 98 may include a current limiting resistor 134, and Zener diodes 136 and 138, each of which have a cathode and an anode electrode $c$ and $a$, respectively. Current limiting resistor 134 is connected between terminals 99 and 103. and the Zener diodes 136 and 138 are connected serially with their cathodes being connected in common. The anode electrode $a$ of Zener diode 136 is connected to terminal 103, and the anode electrode $a$ of Zener diode 138 is connected to both terminals 101 and 105.

Capacitor means 106 may include a capacitor 140 connected between terminals 107 and 111, and a conductor 142 connected between terminals 109 and 113.

Since in this embodiment of the invention the load circuit 16 may have a varying power factor, or a power factor which is other than unity, firing control means 36 must provide gating signals of sufficient duration to assure that the current flow through the gated thyristor reaches its latching value before the gating signal is removed. Firing control means 36 shown in FIG. 2 accomplishes this by providing continuous gate drive once the gate drive is initiated, and which continues as long as the control means 38 provides a signal indicating that the load circuit 16 should be connected to the source 14.

In general, the firing means 36 includes first input terminal means 62 and 64 which receive first control signals from capacitor means 106, and second input terminal means 58 and 66 which receive second control signals from the conventional control means 38. Firing means 36 initiates gating or switching signals from its output terminals 42, 44, 46 and 48, when the first and second control signals coexist. Specifically, firing means 36 includes a silicon controlled rectifier 144, having anode, cathode and gate electrodes, $a$, $c$ and $g$, respectively, and an oscillator 146. Controlled rectifier 144 has its anode electrode $a$ connected through current limiting resistor 148 to input terminal 58, its gate electrode $g$ connected to input terminal 62, and its cathode electrode $c$ connected to input terminal 64. The diode 150 may be connected across the gate-cathode electrodes of controlled rectifier 144, to protect this junction against high reverse voltages.

Oscillator 146 may be of any suitable type, such as the resistive coupled oscillator shown in FIG. 2, which includes transformer 152 having a primary winding 154, a center tap 155 on winding 154, and secondary windings 156 and 158, all disposed on a saturable core 161. Oscillator 146 also includes transistors 160, 162 and 164, which may be of the NPN junction type shown, each having base, emitter and collector electrodes $b$, $e$ and $c$, respectively. The base electrode $b$ of transistor 160 is coupled to the collector electrodes $c$ of transistor 162 via resistor 166, and the base electrode $b$ of transistor 162 is coupled to the collector electrode $c$ of transistor 160 via resistor 168. The center tap 155 of primary winding 154 is connected to input terminal 60, which is connected to positive terminal 43 of source potential 40, and the ends of primary winding 154 are connected to the collector electrodes $c$ of transistors 160 and 162. The emitter electrodes $e$ of transistors 160 and 162 are connected to the collector electrode $c$ of transistor 164. The emitter electrode $e$ of transistor 164 is connected to terminal 66 and thus to ground 68, and the base electrode $b$ of transistor 164 is connected to the cathode electrode $c$ of controlled rectifier 144.

Secondary winding 156 has a center tap 157, which is connected directly to output terminal 42, and also through a filter capacitor 170 to output terminal 44. The ends of secondary winding 156 are connected to terminal 44 via diodes 172 and 174, respectively. Thus, when oscillator 146 is operative, a continuous DC potential will be provided between output terminals 42 and 44.

In like manner, secondary winding 158 has a center tap 159 connected directly to output terminal 48, and also through a filter capacitor 176 to output terminal 46. The ends of secondary winding 158 are connected to terminal 46 via diodes 178 and 180, respectively. Thus, when oscillator 146 is operative, a continuous DC potential will also be provided between output terminals 46 and 48.

The operation of the control circuit 10' shown in FIG. 2 will now be described, using the graphs shown in FIGS. 3A through 3G. The waveform $V_{14}$ shown in FIG. 3A illustrates the voltage of source 14 from terminal 15 to terminal 17. Voltage waveform 14 has zero points 192, 193, 194, 195 and 196, as indicated in FIG. 3A. Potential transformer 128 provides a voltage across its secondary winding 132 which is in phase with the voltage of source 14, with the dotted line waveform $V_{90}$ in FIG. 3B illustrating the voltage across winding 132 from terminal 95 to terminal 97. The voltage $V_{90}$ from secondary winding 132 is clipped by clipping means 98, with the voltage waveform $V_{98}$, shown in solid lines in FIG. 3B, illustrating the voltage from terminals 103 to 105. The clipped voltage $V_{98}$ is applied to input terminals 107 and 109 of capacitor means 106, with capacitor 140 providing a current pulse at its output terminals 111 and 113 only when the magnitude of the voltage $V_{98}$ changes. Thus, as shown in FIG. 3C, positive current pulses 182, 186 and 190 are produced when the voltage $V_{98}$ changes from negative to positive at its zero points 192', 194' and 196', and negative current pulses 184 and 188 are produced when the voltage $V_{98}$ changes, from positive to negative at its zero points 193' and 195'. The positive pulses 182, 186 and 190 are thus synchronized with the zero points of the voltage source 14, and they are applied to the gate electrode $g$ of controlled rectifier 144 in the firing control means 36. These positive current pulses, however, do not switch controlled rectifier 144 to its conductive state, until controlled rectifier 144 has anode voltage, which is responsive to control means 38.

Assume now that it is desired to connect the load circuit 16 to the source 14. The control means 38 will complete the circuit between its terminals 39 and 41, applying a positive anode voltage to controlled rectifier 144, as indicated by waveform 189 in FIG. 3D. The anode voltage is initiated at point 191 and is terminated at point 197. The next positive switching signal pulse from capacitor means 106, subsequent to the initiation of the anode voltage at point 191, will thus switch controlled rectifier 144 to its conductive state, which in turn provides base drive for transistor 164, switching transistor 164 to its conductive condition. When transistor 164 switches to its conductive condition, oscillator 146 will become operative and gate drive will be provided to controlled rectifier 120 as shown in waveform 198 in FIG. 3E, and to controlled rectifier 122 as shown in waveform 199 in FIG. 3F. Controlled rectifier 120 will be switched to its conductive state, allowing the source voltage $V_{14}$ to be applied to the load circuit 16, with the voltage $V_L$ across the load being shown in FIG. 3G. The voltage $V_L$ across the load circuit 16 starts at zero point 194", and since there is no current flowing in load circuit 16, the load current $I_L$ shown in FIG. 3G will start building up slowly from substantially zero at point 194", to the value and phase angle determined by the load circuit 14.

Since the anode voltage of controlled rectifier 144 is unidirectional, controlled rectifier 144 will remain conductive until the anode voltage is removed. Assume that the control means 38 removes the anode voltage at point 197 as shown in FIG. 3D, which point is after the load current $I_L$ has passed through zero at point 202 and has attained its latching magnitude. The conductive controlled rectifier in switching means 12 will continue to conduct until the current falls below its holding magnitude at substantially the current zero point 204. Thus as clearly illustrated in the graph of FIG. 3G, the load current at both turn-on and turn-off of the static switching means 12 is zero, and the change in the load current at there points is gradual, maintaining a low $di/dt$ at these points. Thus, the generation of radio frequency energy is minified in the circuit, eliminating or reducing the size of radio frequency filters, depending upon the RFI limits of the specific application.

If control is desired every half cycle of the source voltage, instead of every full cycle, capacitor means 106 may be connected to the input terminals of a full-wave single-phase bridge rectifier, and the output terminals of the bridge rectifier would be connected across the gate-cathode junction of controlled rectifier 144.

Figure 4:
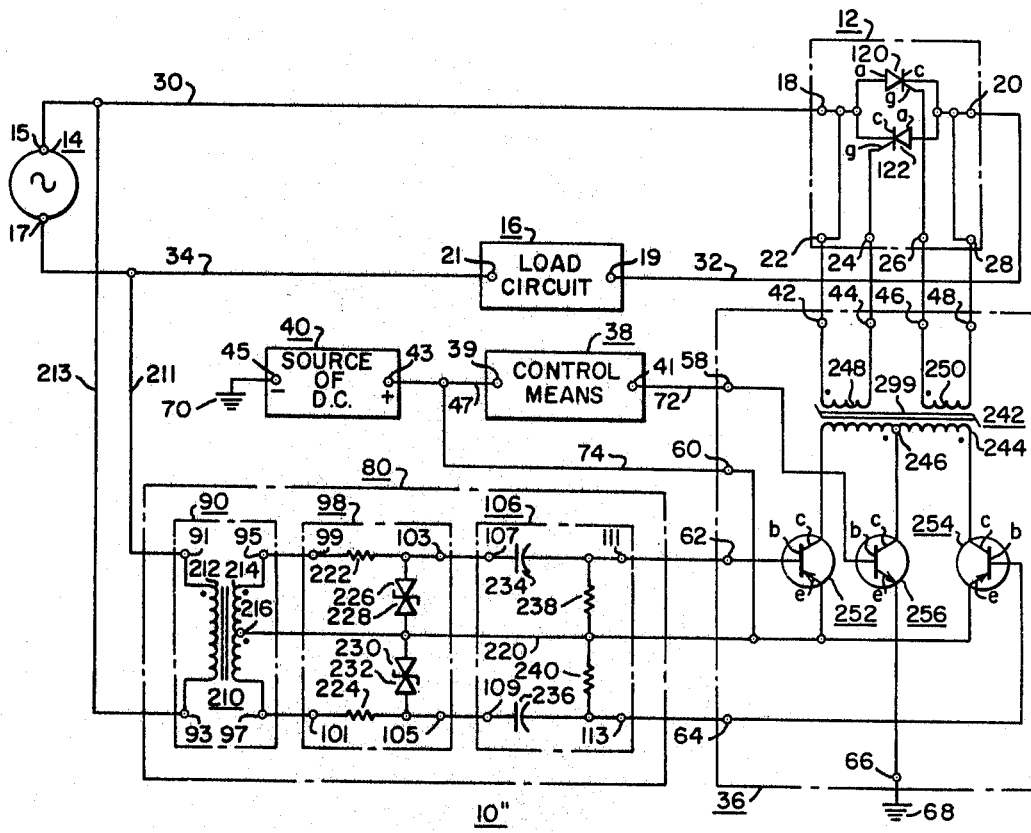
FIG. 4 is a schematic diagram illustrating a control circuit constructed according to another embodiment of the invention.

If the load circuit 16 is purely resistive, it will not be necessary to provide continuous gate drive once it is initiated. FIG. 4 is a schematic diagram of a control circuit 10″ constructed according to an embodiment of the invention wherein the load circuit has a unity power factor. Like reference numerals in FIGS. 1, 2 and 4 indicate like functions and terminals.

In this embodiment of the invention, voltage responsive means 90 is a potential transformer 210 having a primary winding 212 connected to input terminals 91 and 93, which are connected to terminals 15 and 17 of source potential 14 via conductors 211 and 213, respectively, and a secondary winding 214 which has a center tap 216 thereon. The ends of secondary winding 214 are connected to terminals 95 and 97, while the center tap 216 is connected to the positive terminal 43 of the DC source 40, via conductors 220 and 74.

Clipping means 98 includes a resistor 222 connected between terminals 99 and 103, a resistor 224 connected between terminals 101 and 105 and Zener diodes 226, 228, 230 and 232. Zener diodes 226 and 228 are connected serially from terminal 103 to conductor 220, with their cathodes being connected in common, and the anodes of diodes 226 and 228 connected to terminal 103 and conductor 220, respectively. Zener diodes 230 and 232 are connected serially between conductor 220 and terminal 105, with their cathodes being connected in common, and the anodes of diodes 230 and 232 being connected to conductor 220 and to terminal 105, respectively.

Capacitor means 106 includes capacitors 234 and 236, and resistors 238 and 240, with capacitor 234 being connected between terminals 107 and 111, and capacitor 236 being connected between terminals 109 and 113. Resistor 238 is connected from terminal 111 to conductor 220, and resistor 240 is connected from conductor 220 to terminal 113.

Firing means 36 includes a pulse transformer 242 having a primary winding 244, which has a center tap 246 thereon, and secondary windings 248 and 250, all disposed in inductive relation with a magnetic core 299. Firing means 36 also includes transistors 252, 254 and 256, which may be of the junction type having collector, emitter and bare electrodes $c$, $e$ and $b$, respectively. Transistors 252 and 254 are of the PNP type and transistor 256 is of the NPN type. The ends of primary winding 244 are connected to the collector electrodes $c$ of transistors 252 and 254, respectively, and the center tap 246 of primary winding 244 is connected to the collector electrode $c$ of transistor 256. The emitter electrode $e$ of transistor 256 is connected to terminal 66, and thus to ground 68, and its base electrode $b$ is connected to terminal 58, and to the control means via conductor 72. The emitter electrodes $e$ of transistors 252 and 254 are connected to conductor 220, and thus to the positive terminal 43 of the source 40 of DC potential, the base electrode $b$ of transistor 252 is connected to input terminal 62, and the base electrode $b$ of tarnsistor 254 is connected to the input terminal 64. Secondary winding 248 of pulse transformer 242 is connected to output terminals 42 and 44, and secondary winding 250 is connected to output terminals 46 and 48.

Figure 5A:
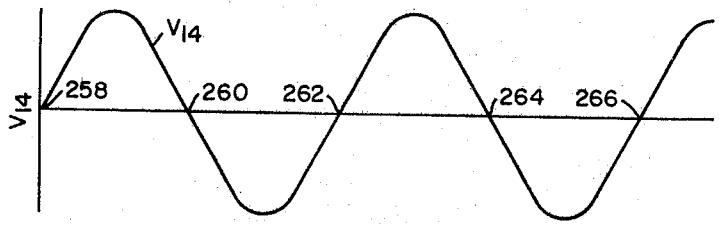
FIGS. 5A through 5I are graphs illustrating certain voltage and current waveforms explanatory of the operation of the embodiment of the invention shown in FIG. 4.
Figure 5B:
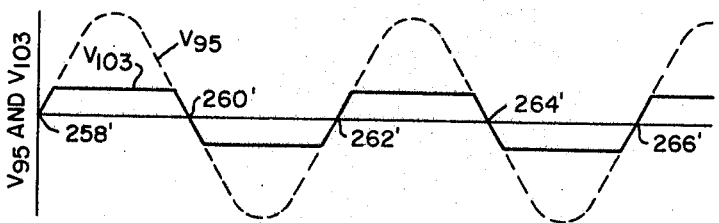

The operation of the control circuit 10″ shown in FIG. 4 will now be described, using the graphs of various current voltage waveforms shown in FIGS. 5A through 5I. The voltage $V_{14}$ of source potential 14, from its terminal 15 to its terminal 17, is shown in FIG. 5A, having zero points 258, 260, 262, 264 and 266. Potential transformer 210 of voltage responsive means 90 provides a voltage across the half of secondary winding 214 from terminal 95 to its center tap 216 as shown in FIG. 5B. Voltage $V_{95}$, shown in FIG. 5B, as applied across Zener diodes 226 and 228 in clipping means 98, providing a voltage $V_{103}$, as shown in FIG. 5B, across terminal 103 and conductor 220.

Figure 5C:
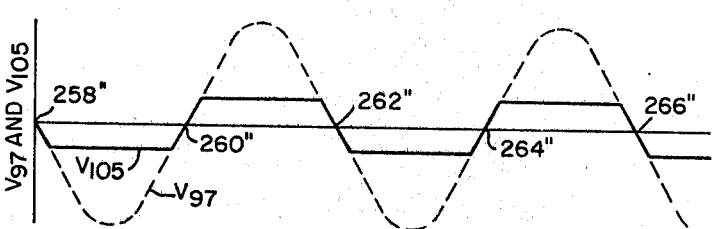
Figure 5D:
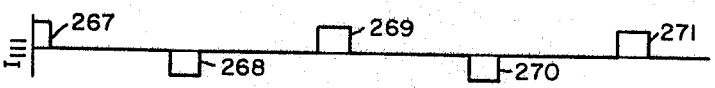
Figure 5E:
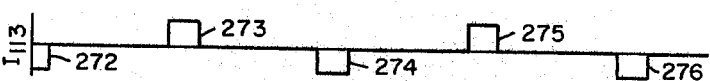

The half of secondary winding 214 from terminal 97 to its center tap 216 has a voltage $V_{97}$, such as shown in FIG. 5C in dotted outline, which is applied across Zener diodes 230 and 232 of clipping means 98. The voltage appearing across the Zener diodes from terminal 105 to conductor 220 is shown in FIG. 5C in solid outline, and is given the reference numeral $V_{105}$. The voltage across Zener diodes 226 and 228 is applied to capacitor 234, providing current pulses at its output terminal 111 during the time the voltage $V_{103}$ shown in FIG. 5B is changing magnitude. As shown in FIG. 5D, positive current pulses 267, 269 and 271 are produced at the voltage zero points 258′, 262′ and 266′, shown inn FIG. 5B. Negative current pulses 268 and 270 are produced at voltage zero points 260′ and 264′.

In like manner the voltage across Zener diodes 232 and 230 is applied to capacitor 236 of clipping means 106, providing current pulses at the voltage zero points of the voltage $V_{105}$ shown in FIG. 5C. Positive current pulses 273 and 275 are produced at the voltage zero points 260″ and 264″, and negative current pulses 272, 274 and 276 are produced at voltage zero points 258″, 262″ and 266″, respectively. The negative pulses 268 and 270 from terminal 111 are applied to transistor 252, providing base drive therefor, and the negative pulses 272, 274 and 276 from terminal 113 are applied to transistor 254, providing base drive therefor. However, the base drive will not provide pulses from the pulse transformer 242, unless transistor 256 is conductive. The conduction of transistor 256 is controlled by control means 38. If base drive is provided for transistor 256 by control means 38, the negative pulses applied to the base electrodes of transistors 252 and 254 will drive these transistors momentarily into conduction, providing pulses in secondary windings 248 and 250, synchronized with the voltage zero points of the voltage of source 14.

Figure 5F:
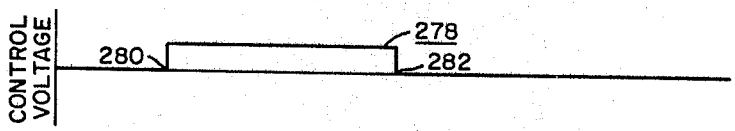
Figure 5G:
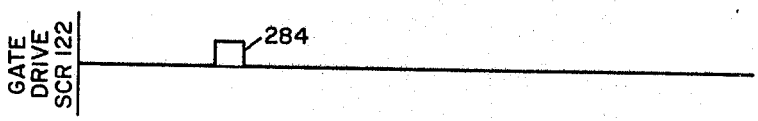
Figure 5H:
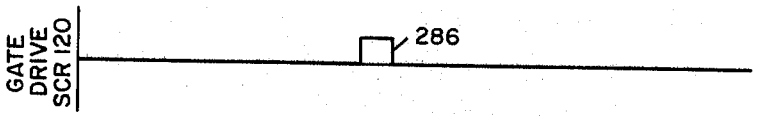
Figure 5I:
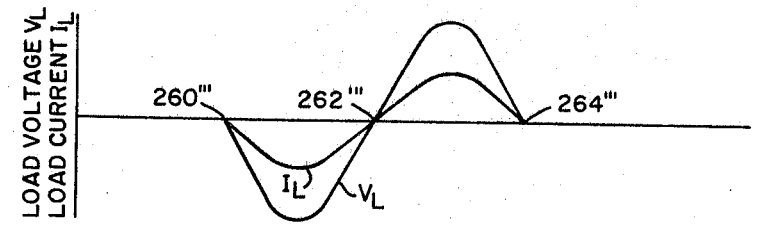

For example, as shown in FIG. 5F, assume that a control voltage 278 is applied to the base electrode $b$ of transistor 256, which is initiated at point 280 and terminated at point 282. The first subsequent negative pulse, which in this instance is pulse 268, will drive transistor 252 into conduction, providing the gating signal 284, as shown in FIG. 5G, for controlled rectifier 122. Load voltage $V_L$ will then start building across the load circuit 16, at zero point 260‴ as shown in FIG. 5I, and since the power factor of the load circuit 16 is unity, the load current $I_L$ will also start building up according to its load limited magnitude along the current waveform $I_L$. It will be noted that the gate drive pulse 284 which gated controlled rectifier 122, was a discrete pulse which terminated shortly after the current magnitude flowing in the controlled rectifier reached the latching current magnitude. Therefore, a gating pulse will be required for controlled rectifier 122 at the start of the next half cycle. Since the control voltage 278 shown in FIG. 5F is still present at zero point 262 of the source voltage 14, the negative current pulse 274 shown in FIG. 5E will be applied to transistor 254, switching transistor 254 momentarily to its conductive condition and applying the gate drive pulse 286, as shown in FIG. 5H, to controlled rectifier 120. Thus, the load voltage $V_L$ will continue into its positive half cycle from zero point 262''', as shown in FIG. 5I. The control voltage 278 shown in FIG. 5F is terminated at point 282, before the end of this last half cycle, but controlled rectifier 122 will remain conductive until reaching zero point 264''', at which point static switching means 12 will be switched to its nonconductive state, as the current pulses applied to the transistors 252 and 254 are not effective in switching them to their conductive states after base drive is removed from transistor 256.

In summary, there has been disclosed new and improved control circuits for connecting a load circuit to a source of AC potential via static switching means, in which the source potential is connected to the load at a voltage zero point, thus allowing the load current to build up slowly from zero, and which disconnects the load circuit from the source at a current zero point. Thus the high $di/dt$ which may be present in prior art control circuits while connecting a load circuit to a source of alternating potential, is greatly reduced, reducing the magnitude of radio frequency energy generated and fed back into the electrical system. Since the radio frequency energy generated is substantially reduced, in some applications radio frequency filters may be eliminated, and when required due to stringent specifications, their size and cost may be reduced. Further, harmonic distortion filters may be eliminated.

The disclosed control circuits may be used with simple on-off manually operated control, or they may be programmed with proportional on-off control in response to suitable regulating means, to regulate predetermined electrical quantities.

While the disclosed control circuits have been described relative to single phase AC circuits, it will be understood that the teachings of the invention may also be extended to polyphase AC circuits.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:
1. An electrical control circuit comprising:
   static bilateral AC switching means having main electrodes adapted for connection between a source of AC potential and a load circuit, and gate electrode means;
   firing means having first and second input terminal means, and output terminal means; said output terminal means being connected to said static switching means, applying switching signals to said gate electrode means which are initiated when said first and second input terminal means have coexisting first and second signals applied thereto, respectively;
   voltage responsive means adapted to be responsive to the source of AC potential, providing a voltage signal in phase with the source of AC potential;
   clipping means connected to said voltage responsive means, clipping the positive and negative peaks of said voltage signal at predetermined magnitudes;
   capacitor means connected to said clipping means, providing a discrete current signal pulse each time the clipped voltage changes between the predetermined clipped magnitudes; said capacitor means being connected to said first input terminal means, providing the first signal for said firing means;
   and control means connected to said second input terminal means, providing the second signal for said firing means during the time it is desirable for said static switching means to connect the source of AC potential to the load circuit.

2. The electrical control circuit of claim 1 wherein said voltage responsive means includes a potential transformer having a primary winding adapted for connection to the source of AC potential, and a secondary winding; and said clipping means includes Zener diode means connected across said secondary winding, clipping both the positive and negative peaks of the voltage across said secondary winding at predetermined magnitudes.

3. The electrical control circuit of claim 1 wherein said firing means includes a controlled rectifier having gate, cathode and anode electrodes; oscillator means connected to be operative and inoperative when said controlled rectifier is conductive and non-conductive, respectively; means rectifying the output voltage of said oscillator means; and means connecting the rectified output voltage of said oscillator means to said output terminal means; said controlled rectifier having its gate and cathode electrodes connected to said first input terminal means, and its anode electrode connected to said second input terminal means.

4. The electrical control circuit of claim 2 wherein said firing means includes a controlled rectifier having gate, cathode and anode electrodes; oscillator means connected to be operative and inoperative when said controlled rectifier is conductive and non-conductive, respectively; means rectifying the output voltage of said oscillator means; and means connecting the rectified output voltage of said oscillator means to said output terminal means; said controlled rectifier having its gate and cathode electrodes connected to said first input terminal means, and its anode electrode connected to said second input terminal means.

5. The electrical control circuit of claim 1 wherein said voltage responsive means includes a potential transformer having a primary winding adapted for connection to the source of alternating potential, and a secondary winding having first and second ends and a center tap; scaid clipping means includes Zener diode means connected from each end of the secondary winding to its center tap, clipping both the positive and negative peaks of the voltage across each half of the secondary winding; and said capacitor means includes first and second capacitors connected to the first and second ends, respectively, of the secondary winding, providing discrete current signal pulses each time the clipped voltage across each half of the secondary winding changes between its predetermined clipped magnitudes; said discrete current pulses providing the first signal for said firing means.

6. The electrical control circuit of claim 1 wherein said firing means includes a pulse transformer having a primary winding having first and second ends and a center tap, and secondary winding means connected to said output terminal means; first, second and third transistors each having base, collector and emitter electrodes, respectively; the collector electrodes of said first and second transistors being connected to the first and second ends, respectively, of said primary winding; the collector electrode of said third transistor being connected to the center tap of said primary winding; the base and emitter electrodes of said first and second transistors being connected to said first input terminal means; and the base and emitter electrodes of said third transistor being connected to said second input terminal means.

7. The electrical control circuit of claim 5 wherein said firing means includes a pulse transformer having a primary winding having first and second ends and a center tap, and secondary winding means connected to said output terminal means; first, second and third transistors each having base, collector and emitter electrodes, respectively; said collector electrodes of said first and second transistors being connected to the first and second ends, respectively, of said primary winding; the collector electrode of said third transistor being connected to the center tap of said primary winding; the base and emitter electrodes of said first and second transistors being connected to said first input terminal means; and the base and emitter electrodes of said third transistors being connected to said second input terminal means.

8. The electrical control circuit of claim 1 wherein the switching signals provided by said firing means are continuous, once initiated by the coexistence of said first and second signals at its first and second input terminals, terminating when said second signal is removed from said second input terminal means, insuring the switching of said static bi-lateral AC switching means when the load circuit has a power factor other than unity.

9. The electrical control circuit of claim 1 wherein the switching signals provided by said firing means are discrete pulses, initiated and terminated by the discrete current signal pulses from said voltage responsive means when a second signal from said control means exists at said second input terminal means.

References Cited

UNITED STATES PATENTS

| | | |
|---|---|---|
| 2,441,789 | 5/1948 | Bivens. |
| 3,321,668 | 5/1967 | Baker. |
| 3,363,143 | 1/1968 | Cavanaugh. |
| 3,401,303 | 9/1968 | Walker. |

ROBERT S. MACON, Primary Examiner

T. B. JOIKE, Assistant Examiner

U.S. Cl. X.R.

307—252